(12) United States Patent
Hu et al.

(10) Patent No.: US 11,691,043 B2
(45) Date of Patent: Jul. 4, 2023

(54) MULTI-FUNCTIONAL PLUGGING AGENT FOR COAL MINE AND PREPARATION METHOD THEREOF

(71) Applicant: SHANDONG UNIVERSITY OF SCIENCE AND TECHNOLOGY, Qingdao (CN)

(72) Inventors: Xiangming Hu, Qingdao (CN); Weimin Cheng, Qingdao (CN); Bingrui Yan, Qingdao (CN); Yanyun Zhao, Qingdao (CN); Di Xue, Qingdao (CN); Mingyue Wu, Qingdao (CN); Zhenglong He, Qingdao (CN); Guangxing Bai, Qingdao (CN); Zonglei Mou, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/868,037

(22) Filed: Jul. 19, 2022

(65) Prior Publication Data

US 2022/0362599 A1 Nov. 17, 2022

Related U.S. Application Data

(63) Continuation of application No. PCT/CN2021/076121, filed on Feb. 9, 2021.

(30) Foreign Application Priority Data

Jan. 6, 2021 (CN) .................... CN202110010867.5

(51) Int. Cl.
*A62D 1/00* (2006.01)
*B01D 11/02* (2006.01)
(Continued)

(52) U.S. Cl.
CPC .......... *A62D 1/005* (2013.01); *B01D 11/0288* (2013.01); *C09K 21/02* (2013.01); *C09K 21/06* (2013.01); *E21F 15/005* (2013.01)

(58) Field of Classification Search
CPC ............................. C09K 21/06; E21F 15/005
See application file for complete search history.

(56) References Cited

U.S. PATENT DOCUMENTS

2022/0389817 A1* 12/2022 Behling ............. C08G 18/7671

FOREIGN PATENT DOCUMENTS

| CN | 101041710 A | 9/2007 |
| CN | 101250398 A | 8/2008 |

(Continued)

OTHER PUBLICATIONS

English machine translation of Chang CN 102224964 A. (Year: 2011).*
Internation Search Report of PCT/CN2021/076121, dated Oct. 11, 2021.

*Primary Examiner* — Peter F Godenschwager

(57) ABSTRACT

Provided is a multi-functional plugging agent for a coal mine and a preparation method thereof. The preparation method comprises: by taking Ecklonia Kurome Okam as a raw material, mixing an Ecklonia Kurome Okam suspension with phosphorus pentoxide for reaction, then performing biodegradation to obtain an Ecklonia Kurome Okam biological extract, adding urea for neutralization, mixing a neutralization product with an inorganic catalyst and melamine for reaction to obtain a bio-based plugging synergist solution, finally cooling the bio-based plugging synergist solution, and mixing the cooled bio-based plugging synergist solution with a certain amount of pentaerythritol and ammonium polyphosphate to obtain the multi-functional plugging agent for the coal mine based on the Ecklonia Kurome Okam biological extract. According to the inven- (Continued)

tion, not only a coal crack can be effectively plugged for a long time, but also an efficient flame-retardant effect can be achieved in a complete period of coal spontaneous combustion.

1 Claim, 3 Drawing Sheets

(51) Int. Cl.
    *C09K 21/02*     (2006.01)
    *C09K 21/06*     (2006.01)
    *E21F 15/00*     (2006.01)

(56) References Cited

FOREIGN PATENT DOCUMENTS

| | | | |
|---|---|---|---|
| CN | 102224964 A | * | 10/2011 |
| CN | 102319499 A | | 1/2012 |
| CN | 103113865 A | | 5/2013 |
| CN | 103555038 A | | 2/2014 |
| CN | 105367825 A | | 3/2016 |
| CN | 107060874 A | | 8/2017 |
| CN | 107151552 A | | 9/2017 |
| CN | 107189772 A | | 9/2017 |
| CN | 107285723 A | | 10/2017 |
| CN | 107502322 A | | 12/2017 |
| CN | 108708764 A | | 10/2018 |
| CN | 110627440 A | | 12/2019 |
| CN | 110724507 A | | 1/2020 |
| CN | 111094514 A | | 5/2020 |
| WO | 0071591 A1 | | 11/2000 |

\* cited by examiner

MULTI-FUNCTIONAL PLUGGING AGENT FOR COAL MINE AND PREPARATION METHOD THEREOF

CROSS-REFERENCE TO RELATED APPLICATIONS

This application is a continuation of International Patent Application No. PCT/CN2021/076121 with a filing date of Feb. 9, 2021, designating the United States, and further claims priority to Chinese Patent Application No. 202110010867.5 with a filing date of Jan. 6, 2021. The content of the aforementioned applications, including any intervening amendments thereto, are incorporated herein by reference.

TECHNICAL FIELD

The present invention belongs to the technical field of fire prevention and extinguishing materials for coal mines, relates to a multi-functional plugging agent for a coal mine and a preparation method thereof, and more particularly, relates to a multi-functional plugging agent for a coal mine based on an Ecklonia Kurome Okam biological extract and a preparation method thereof.

BACKGROUND

Energy distribution in China is characterized by "rich in coal, poor in oil and lacking in gas". Although the awareness of environmental protection has been gradually increased and the development and utilization of new energy have been gradually developed in recent years, a main part of energy consumption in China is still coal due to the limitation of cost and technology. However, according to statistics, more than half of state-owned key coal mines in China are in danger of spontaneous combustion, wherein the spontaneous combustion of more than 90° % of the coal mines is caused by coal spontaneous combustion. A main cause of the coal spontaneous combustion is the oxidation of a coal seam, and this reaction is the most hidden in all coal mine accidents, and may also cause mine gas explosion, produce toxic and harmful gases, and even cause secondary disasters such as coal dust explosion at the same time. In addition, water gas explosion often occurring during fire extinguishment may bring great safety threats to life and property underground. Therefore, the prevention and control of a spontaneous combustion disaster of coal is of great significance to promote economic development and social harmony and progress in mining areas and respond to sustainable development.

During practical application of mine production at present, mud, inert gas, foam and polyurethane are commonly used to plug a crack on a coal surface, but these plugging materials have their own limitations. In the practical application of a grouting technology, a liquid may flow from a high terrain to a low terrain, so that it is difficult to cover the coal surface or a goaf surface uniformly, and it is further impossible to plug a high-position crack of a goaf. For an inert gas injection method, since the goaf is easy to be communicated with the outside and is difficult to form a closed space, gas is in a state of outward leakage as a whole and has a gradually reduced concentration, and oxygen enters the goaf gradually, resulting in poor fire prevention and extinguishing effects, and a long fire extinguishing period. Although foams may be piled up in the goaf to plug the high-position crack, the foams are easy to lose water and break, thus losing the plugging function. Although a polyurethane plugging material can effectively plug a gap between coal seams and isolate oxygen, the polyurethane itself is an organic combustible material, which not only cannot inhibit the spontaneous combustion of the coal seam, but also can combust to be carbonized, thus releasing a large amount of heat to deteriorate a coal mine fire disaster, and releasing a large amount of toxic gas to endanger the life safety of mine workers.

SUMMARY

The present invention provides a multi-functional plugging agent for a coal mine and a preparation method thereof, the multi-functional plugging agent for the coal mine contains an Ecklonia Kurome Okam extract, and the Ecklonia Kurome Okam extract is preferably an Ecklonia Kurome Okam biological extract. The plugging agent has abundant and easily available raw materials which are nontoxic and harmless, and the plugging agent can not only plug a coal crack twice in a mine, but also achieve an efficient flame-retardant effect in a complete period (comprising low temperature, medium temperature and high temperature) of coal spontaneous combustion. The technical solutions used in the present invention are as follows.

A preparation method of a multi-functional plugging agent for a coal mine based on an Ecklonia Kurome Okam biological extract comprises:

(1) soaking Ecklonia Kurome Okam in fresh water in a light-proof tank for 3 hours to 4 hours, taking out and then washing the soaked Ecklonia Kurome Okam with running water for 2 times to 3 times, then putting the washed Ecklonia Kurome Okam in a drying oven for drying at 90° C. to 100° C. for 50 minutes to 60 minutes, crushing the dried Ecklonia Kurome Okam in a pulverizer for 3 minutes to 5 minutes, and screening Ecklonia Kurome Okam powder with a particle size less than 120 meshes;

(2) putting the Ecklonia Kurome Okam powder into a reaction container for mixing with water to obtain an Ecklonia Kurome Okam suspension, heating the Ecklonia Kurome Okam suspension to 45° C. to 55° C., stirring the Ecklonia Kurome Okam suspension in an air atmosphere and slowly adding phosphorus pentoxide, stirring the mixture for reaction for 30 minutes and then adding a complex enzyme for continuous stirring for 30 minutes, standing the mixture for reaction for 50 hours to 55 hours, and filtering the mixture to obtain the Ecklonia Kurome Okam biological extract;

(3) adding urea into the Ecklonia Kurome Okam biological extract obtained in step (2) for neutralizing and stirring for 20 minutes, heating the mixture to 60° C. and then stirring the mixture in a nitrogen atmosphere, and sequentially adding 0.5% to 2% by mass fraction of inorganic catalyst and 1% to 3% by mass fraction of melamine for full reaction and mixing to obtain a bio-based plugging synergist solution; and (4) after cooling the bio-based plugging synergist solution obtained in step (3), uniformly stirring and mixing the solution with pentaerythritol and ammonium polyphosphate to obtain the multi-functional plugging agent for the coal mine based on the Ecklonia Kurome Okan biological extract.

The plugging agent prepared by the biological extraction method is directly prepared by taking natural organisms as raw materials, thus having a higher utilization rate of materials, which can reach more than 40%, a simple technology, a remarkable effect, and a very high economic benefit.

Preferably, a mixing ratio of the Ecklonia Kurome Okam powder to water in step (2) is 1:35 to 1:45 in a mass ratio; an addition amount of the phosphorus pentoxide in step (2) is the phosphorus pentoxide to water of 1:13 to 1:42 (in a mass ratio); and the complex enzyme in step (2) is one or more of endoglucanase, cellobiase, carboxypeptidase and beta-glucosidase, with an addition amount of 0.5% to 1.5% by mass fraction.

Preferably, the inorganic catalyst in step (3) is a layered metal composite hydroxide, a chemical composition of a host layer plate may be adjusted, types and quantities of interlayer guest anions may be adjusted, and a particle size and distribution of intercalated assemblies may be adjusted; and an addition amount of the urea in step (3) is the urea to the phosphorus pentoxide of 1:1 to 1:3 (in a mass ratio).

Preferably, after cooling the bio-based plugging synergist solution obtained in step (4), 100 parts to 105 parts by weight of the solution are uniformly stirred and mixed with 3 parts to 5 parts by weight of the pentaerythritol and 2 parts to 5 parts by weight of the ammonium polyphosphate.

The present invention further comprises a multi-functional plugging agent for a coal mine obtained by the preparation method above, and a preparation containing the multi-functional plugging agent for the coal mine.

The multi-functional plugging agent for the coal mine based on the Ecklonia Kurome Okam biological extract in the present invention may plug a coal crack twice in a mine, and achieve an efficient flame-retardant effect in a complete period of coal spontaneous combustion. Before dehydration, the multi-functional plugging agent for the coal mine based on the Ecklonia Kurome Okam biological extract is attached to a coal rock surface by its own biological adhesion to isolate a contact between coal and oxygen, and rich hydroxyls in the inorganic catalyst are linked with active carboxyls on the coal surface by hydrogen bonding at the same time, thus improving a stability of the coal surface; and with slow water evaporation, the completely dehydrated multi-functional plugging agent for the coal mine based on the Ecklonia Kurome Okam biological extract is subjected to self-foaming and expansion to realize secondary filling on the coal surface, and an acid releases free radicals such as PO· during esterification with alcohol, captures free radicals produced by coal-oxygen recombination, cuts off a combustion reaction chain, and then is subjected to a phase change into a solid dense carbon layer to absorb acid gas produced during combustion, thus significantly reducing a release rate of CO and heat radiation, and increasing a characteristic temperature point of the coal spontaneous combustion. The advantages of air plugging and fire prevention are mainly reflected in the following aspects.

(1) The multi-functional plugging agent for the coal mine based on the Ecklonia Kurome Okam biological extract in the present invention may effectively plug a coal seam crack for many times. Before dehydration, the plugging agent is effectively attached to the coal surface and filled in the coal crack during flowing by its own biological adhesion; and the completely dehydrated plugging agent is subjected to the phase change from a layer of solid film into a liquid, and subjected to self-foaming and expansion to form a foam layer with a volume more than 50 times of that of the plugging agent itself, thus effectively plugging the coal seam crack by secondary filling.

(2) The multi-functional plugging agent for the coal mine based on the Ecklonia Kurome Okam biological extract in the present invention may have a good inhibiting effect in all stages of coal oxidation and decomposition. In a low temperature stage, the plugging agent may retain water to infiltrate the coal for a long time, and take away a lot of heat through water evaporation, and meanwhile, the plugging agent is linked with a functional group on the coal surface through a hydrogen bond to enhance a stability of the active functional group of the coal; after water evaporation, the phosphorus pentoxide and the urea product, and the ammonium polyphosphate and the alcohol substance in the plugging agent are melted and esterified under catalysis of the metal composite hydroxide, and the free radicals such as PO· are released to cut off the combustion reaction chain, and meanwhile, the melamine, a part of the ammonium polyphosphate and the metal composite hydroxide are decomposed to release a lot of inert gases (such as $NH_3$ and $CO_2$) so as to dilute oxygen around the coal; and when a temperature is increased to about 300° C., the expanded esterified product is carbonized into the solid carbon layer, the metal composite hydroxide is further decomposed under an action of the temperature to form a metal composite oxide, and the two are intersected to form a dense three-dimensional network structure to block heat transfer. This series of processes make the plugging agent have a longer operating temperature range and a higher flame-retardant efficiency than a common plugging agent.

(3) The plugging agent is dehydrated quickly when encountering a high-temperature fire source, decomposed to release a lot of inert gas and take away a part of heat, and expanded rapidly to form the dense porous carbon layer at the same time, and may be accumulated in the goaf, thus effectively covering a high-position ignition point. An alkaline nature of the internal metal composite oxide may adsorb the acid gas produced during combustion, thus having a certain smoke suppression function.

DETAILED DESCRIPTION

Figure 1:
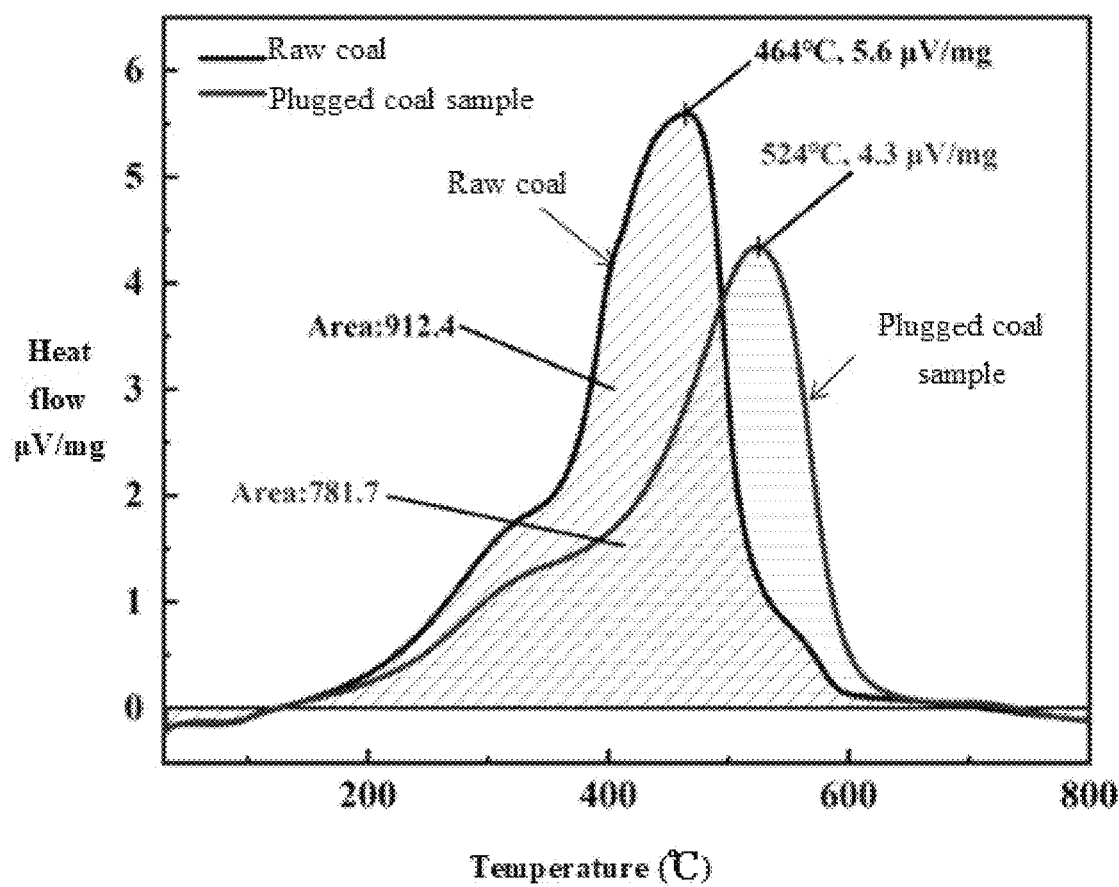
FIG. 1 shows DSC curves of coal powder before and after using a plugging agent.

The present invention is further described hereinafter with reference to specific embodiments, and the advantages and features of the present invention will become clearer with the description. However, the embodiments are only illustrative, and are not intended to limit the scope of the present invention. Those skilled in the art should understand that the details and forms of the technical solutions of the present invention may be modified or substituted without departing from the spirit and scope of the present invention, but all these modifications and substitutions fall within the scope of protection of the present invention.

Embodiment 1

Ecklonia Kurome Okam was soaked in fresh water in a light-proof tank for 3 hours, the soaked Ecklonia Kurome Okam was taken out and then washed with running water for 2 times, then the washed Ecklonia Kurome Okam was put in a drying oven for drying at 90° C. for 50 minutes, the dried Ecklonia Kurome Okam was crushed in a pulverizer for 5 minutes, and Ecklonia Kurome Okam powder with a particle size less than 120 meshes was screened. 25 kg of Ecklonia Kurome Okam powder was put into a reaction container for mixing with 1,000 kg of water to obtain an Ecklonia Kurome Okam suspension, the Ecklonia Kurome Okam suspension was heated to 45° C., stirred in an air atmosphere and slowly added with phosphorus pentoxide until a ph value of the suspension was equal to 5.5, the mixture was stirred for reaction for 30 minutes and then added with 10.25 kg of complex enzyme of carboxypeptidase: beta-glucosidase of 1:2 for continuous stirring for 30 minutes, and the mixture was stood for reaction for 50 hours, and filtered to obtain the Ecklonia Kurome Okam biological extract.

Urea was added into the Ecklonia Kurome Okam biological extract above until the solution was neutral, and stirred for 20 minutes, and the mixture was heated to 60° C., then stirred in a nitrogen atmosphere, and sequentially added with 0.5 kg of Mg—Al—$CO_3$ hydrotalcite layer and 10 kg of melamine for full reaction and mixing to obtain a bio-based plugging synergist solution. After cooling, the solution was uniformly stirred and mixed with 50 kg of pentaerythritol and 20 kg of ammonium polyphosphate to obtain the multi-functional plugging agent for the coal mine based on the Ecklonia Kurome Okam biological extract.

Slurry was transported through an iron pipe, and sprayed on a burning coal pile or injected into a goaf. There were a large number of hydroxyls in the Mg—Al—$CO_3$ hydrotalcite layer plate, these —OH could be linked with —COO— in the coal through hydrogen bonds, and some —COO— functional groups could also be complexed with metal ions in the hydrotalcite, thus improving a stability of C═O groups on a coal surface. Meanwhile, a large amount of water retained by the plugging agent covered the coal surface to isolate the coal from oxygen. When a temperature of the coal was increased to about 170° C., the phosphorus pentoxide and the urea product, and the ammonium polyphosphate and the alcohol substance (pentaerythritol, sodium alginate, fructose and galacturonic acid) in the plugging agent were melted and esterified under catalysis of the Mg—Al—$CO_3$ hydrotalcite, and PO· was released to capture active free radicals on the coal surface and block a chain reaction. The melamine and a part of the ammonium polyphosphate were decomposed by heat to release a lot of inert gas, so that the melted plugging agent was expanded to form a foam layer with a thickness of 55 times of that of the plugging agent itself, and oxygen in the environment was diluted. When the temperature exceeded 300° C., the liquid foam layer was subjected to a phase change and carbonized into a solid carbon layer, which was filled in a coal briquette crack to isolate oxygen and heat during combustion, with a coverage rate on the coal briquette crack reaching more than 55%. The Mg—Al—$CO_3$ hydrotalcite was dehydrated at high temperature to form a metal composite oxide, which was intersected with a carbon chain to form a three-dimensional network structure, thus enhancing a density of the carbon layer and greatly improving a flame-retardant efficiency.

Embodiment 2

Ecklonia Kurome Okam was soaked in fresh water in a light-proof tank for 3 hours, the soaked Ecklonia Kurome Okam was taken out and then washed with running water for 2 times, then the washed Ecklonia Kurome Okam was put in a drying oven for drying at 90° C. for 50 minutes, the dried Ecklonia Kurome Okam was crushed in a pulverizer for 5 minutes, and Ecklonia Kurome Okam powder with a particle size less than 120 meshes was screened. 25 kg of Ecklonia Kurome Okam powder was put into a reaction container for mixing with 1,000 kg of water to obtain an Ecklonia Kurome Okam suspension, the Ecklonia Kurome Okam suspension was heated to 45° C., stirred in an air atmosphere and slowly added with phosphorus pentoxide until a ph value of the suspension was equal to 6, the mixture was stirred for reaction for 30 minutes and then added with 10.25 kg of complex enzyme of carboxypeptidase:cellobiase:endoglucanase of 1:1:1 for continuous stirring for 30 minutes, and the mixture was stood for reaction for 50 hours, and filtered to obtain the Ecklonia Kurome Okam biological extract.

Urea was added into the Ecklonia Kurome Okam biological extract above until the solution was neutral, and stirred for 20 minutes, and the mixture was heated to 60° C., then stirred in a nitrogen atmosphere, and sequentially added with 1 kg of Zn—Al—$CO_3$ hydrotalcite layer and 10 kg of melamine for full reaction and mixing to obtain a bio-based plugging synergist solution. After cooling, the solution was uniformly stirred and mixed with 40 kg of pentaerythritol and 10 kg of ammonium polyphosphate to obtain the multi-functional plugging agent for the coal mine based on the Ecklonia Kurome Okam biological extract.

Slurry and compressed air were simultaneously transported underground a coal mine through an iron pipe, and then atomized and sprayed through a nozzle, so as to be sprayed on a burning coal pile or a goaf. There were a large number of hydroxyls in the Zn—Al—$CO_3$ hydrotalcite layer plate, these —OH could be linked with —COO— in the coal through hydrogen bonds, and some —COO— functional groups could also be complexed with metal ions in the hydrotalcite, thus improving a stability of C═O groups on a coal surface. Meanwhile, a large amount of water retained by the plugging agent covered the coal surface to isolate the coal from oxygen. Under an action of the temperature of the coal pile, water in the slurry was gradually evaporated and taken away heat on the coal surface. When the temperature reached about 180° C., the phosphorus pentoxide and the urea product, and the ammonium polyphosphate and the alcohol substance (pentaerythritol, sodium alginate, fructose and galacturonic acid) in the plugging agent were melted and esterified under catalysis of the Zn—Al—$CO_3$ hydrotalcite, and PO· was released to capture active free radicals on the coal surface and block a chain reaction. The melamine and a part of the ammonium polyphosphate were decomposed by heat to release a lot of inert gas, so that the melted plugging agent was expanded to form a foam layer with a thickness of 52 times of that of the plugging agent itself, and oxygen in the environment was diluted. When the temperature exceeded 250° C., the liquid foam layer was subjected to a phase change and carbonized into a solid carbon layer, which was coated on the coal surface to isolate heat, with a coverage rate on the coal briquette crack reaching more than 60%. The Zn—Al—$CO_3$ hydrotalcite was dehydrated at high temperature to form a metal composite oxide, which was intersected with a carbon chain to form a three-dimensional network structure, thus enhancing a density of the carbon layer and greatly improving a flame-retardant efficiency.

Embodiment 3

Ecklonia Kurome Okam was soaked in fresh water in a light-proof tank for 3 hours, the soaked Ecklonia Kurome Okam was taken out and then washed with running water for 2 times, then the washed Ecklonia Kurome Okam was put in a drying oven for drying at 90° C. for 50 minutes, the dried Ecklonia Kurome Okam was crushed in a pulverizer for 5 minutes, and Ecklonia Kurome Okam powder with a particle size less than 120 meshes was screened. 25 kg of Ecklonia Kurome Okam powder was put into a reaction container for mixing with 1,000 kg of water to obtain an Ecklonia Kurome Okam suspension, the Ecklonia Kurome Okam suspension was heated to 45° C., stirred in an air atmosphere and slowly added with phosphorus pentoxide until a ph value of the suspension was equal to 5.8, the mixture was stirred for reaction for 30 minutes and then added with 10.25 kg of complex enzyme of cellobiase:endoglucanase of 1:1 for continuous stirring for 30 minutes, and the mixture was stood for reaction for 50 hours, and filtered to obtain the Ecklonia Kurome Okam biological extract.

Urea was added into the Ecklonia Kurome Okam biological extract above until the solution was neutral, and stirred for 20 minutes, and the mixture was heated to 60° C., then stirred in a nitrogen atmosphere, and sequentially added with 1 kg of Ca—Mg—Al—$CO_3$ hydrotalcite layer and 10 kg of melamine for full reaction and mixing to obtain a bio-based plugging synergist solution. After cooling, the solution was uniformly stirred and mixed with 40 kg of pentaerythritol and 10 kg of ammonium polyphosphate to obtain the multi-functional plugging agent for the coal mine based on the Ecklonia Kurome Okam biological extract.

Slurry was transported through an iron pipe, and sprayed on a burning coal pile or injected into a goaf. There were a large number of hydroxyls in the Ca—Mg—Al—$CO_3$ hydrotalcite layer plate, these —OH could be linked with —COO— in the coal through hydrogen bonds, and some —COO— functional groups could also be complexed with metal ions in the hydrotalcite, thus improving a stability of C═O groups on a coal surface. Meanwhile, a large amount of water retained by the plugging agent covered the coal surface to isolate the coal from oxygen. Under an action of the temperature of the coal pile, water in the slurry was gradually evaporated and taken away heat on the coal surface. When the temperature reached about 200° C., the phosphorus pentoxide and the urea product, and the ammonium polyphosphate and the alcohol substance (pentaerythritol, sodium alginate, fructose and galacturonic acid) in the plugging agent were melted and esterified under catalysis of the Ca—Mg—Al—$CO_3$ hydrotalcite, and PO· was released to capture active free radicals on the coal surface and block a chain reaction. The melamine and a part of the ammonium polyphosphate were decomposed by heat to release a lot of inert gas, so that the melted plugging agent was expanded to form a foam layer with a thickness of 50 times of that of the plugging agent itself, and oxygen in the environment was diluted. When the temperature exceeded 250° C., the liquid foam layer was subjected to a phase change and carbonized into a solid carbon layer, which was filled in a coal briquette crack to isolate oxygen and heat during combustion, with a coverage rate on the coal briquette crack reaching more than 60%. The Ca—Mg—Al—$CO_3$ hydrotalcite was dehydrated at high temperature to form a metal composite oxide, which was intersected with a carbon chain to form a three-dimensional network structure, thus enhancing a density of the carbon layer and greatly improving a flame-retardant efficiency.

Experimental Example 1: amounts of CO released during oxidation of coal powder before and after using a multi-finctional plugging agent for a coal mine in the present invention were shown in Table 1, and specific test conditions and methods were as follows.

Pure coal powder, inhibited coal powder containing 10% plugging agent and inhibited coal powder containing 10% traditional halide salt inhibitor ($CaCl_2$) were prepared respectively. A sample was heated to 210° C. at a rate of 1.0° C./min by a temperature-programmed device, 50 g of the sample was placed in a reactor of the device for each test, and dry air entered the reactor at a rate of 50 mL/min. After the reactor was heated to a predetermined initial temperature, temperatures of a coal sample and a furnace were recorded, and a CO content in exhaust gas at an outlet of the reactor was analyzed by gas chromatography at an interval of 100° C. from 400° C.

TABLE 1

| | CO release amount/ppm | | |
|---|---|---|---|
| Temperature/° C. | Pure coal powder | Traditional halide salt $CaCl_2$ | Coal powder using plugging agent |
| 30 | 0 | 0 | 0 |
| 40 | 0 | 0 | 0 |
| 50 | 4.6724 | 3.7585 | 3.0948 |
| 60 | 16.1638 | 14.7132 | 9.5056 |
| 70 | 51.1433 | 35.1935 | 27.3010 |
| 80 | 126.4061 | 88.7682 | 64.1075 |
| 90 | 262.9147 | 175.316 | 126.7782 |
| 100 | 493.5017 | 343.3084 | 229.4608 |
| 11.0 | 874.2355 | 515.2369 | 379.4503 |
| 120 | 1487.577 | 984.123 | 539.1666 |
| 130 | 2545.423 | 1608.9754 | 734.0314 |
| 140 | 3913.034 | 2513.023 | 1000.520 |
| 150 | 6085.048 | 3510.468 | 1329.789 |
| 160 | 9120.185 | 5417.306 | 1703.731 |
| 170 | 13690.13 | 8644.89 | 2146.055 |
| 180 | 19317.16 | 13400.31 | 2800.173 |
| 190 | 25143.46 | 18627.17 | 3902.491 |
| 200 | 27674.86 | 24023.1 | 5778.521 |

It can be seen from data in Table 1 that, a CO release amount of a coal sample processed with the plugging agent in a low temperature stage is obviously lower than that of a coal sample processed with the traditional $CaCl_2$). According to a calculation formula $$E = \frac{Cr - Ct}{Cr} \times 100\%$$

of a inhibiting rate (wherein E is a inhibiting rate of a sample, Cr is a CO release amount of a raw coal sample, in a unit of ppm, and Ct is a CO release amount of a coal sample subjected to inhibition at a temperature t, in a unit of ppm), by calculation, a inhibiting rate of coal powder processed with the multi-functional plugging agent for the mine is 47% at 70° C., which is 15.8% higher than that of the traditional $CaCl_2$), and the inhibiting rate of the coal powder processed with the multi-functional plugging agent for the mine is 53.5% at 100° C., which is 23.1% higher than that of the traditional $CaCl_2$). The multi-functional plugging agent for the mine has an excellent inhibiting effect in the low temperature stage, and the effect continues to be improved with the increased temperature.

Figure 2:
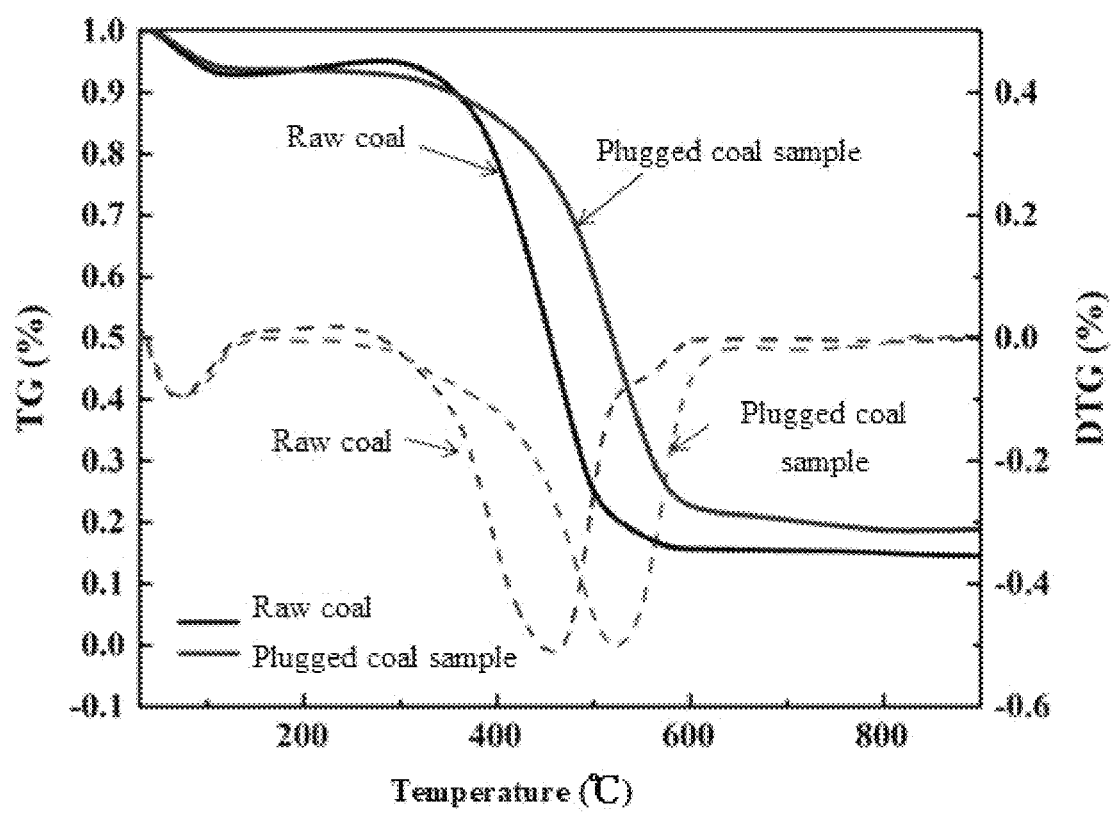
FIG. 2 shows TG/DTG curves of the coal powder before and after using the plugging agent.

Experimental Example 2: DSC curves of coal powder before and after using a multi-functional plugging agent for a coal mine in the present invention were shown in FIG. 1; and TG/DTG curves of the coal powder before and after using the multi-functional plugging agent for the coal mine in the present invention were shown in FIG. 2. An instrument used in a test of thermogravimetry (TG) and differential scanning calorimetry (DSC) was a synchronous thermal analyzer (Labsys Evo STA, SETARAM; France), which heated a sample from 30° C. to 900° C. at 10 k/min in 50 mL/min air atmosphere.

Analysis of results: it can be seen from the TG curves that, an oxygen absorption and weight gain stage of a processed coal sample is not obvious, which indicates that a recombination process of coal and oxygen is inhibited; meanwhile, the DTG curves reflect a weight loss rate of the sample, a temperature point at which processed coal powder reaches a maximum weight loss rate is delayed by 60° C., while a traditional halide salt inhibitor has a catalytic effect in a later stage of inhibition, so that the temperature point of the maximum weight loss rate is advanced; and it can be seen from the DSC curves that, a heat release amount of the coal sample processed with the multi-functional plugging agent is obviously reduced, a heat release time is also obviously delayed, and according to integral calculation, the heat release amount reduced per unit mass may reach 20%. Experimental data show that the plugging agent has an obvious inhibition effect on coal spontaneous combustion and a long flame-retardant life, and may still have an efficient flame-retardant effect in a later stage of oxidation.

Figure 3:
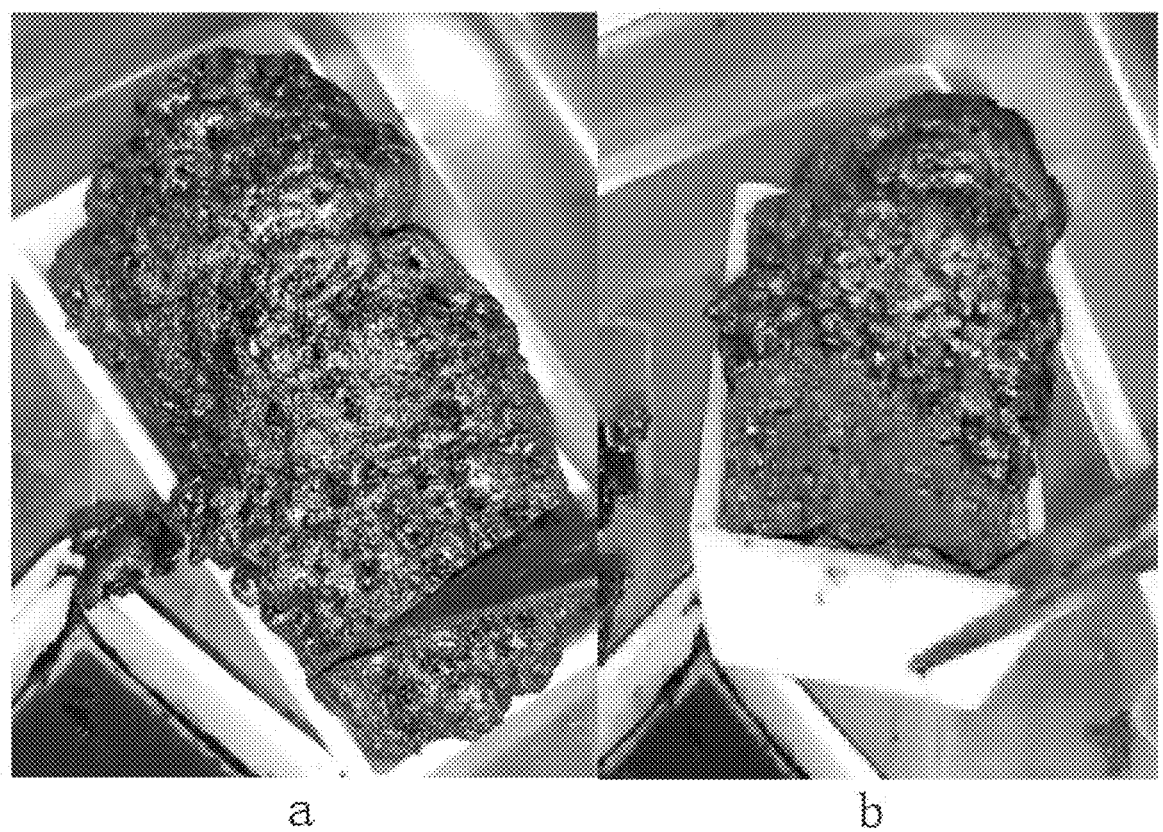
FIG. 3 is a macroscopic topographic image of a porous three-dimensional plugging carbon layer (wherein a is a surface morphology of the carbon layer and b is an internal morphology of the carbon layer)

Experimental Example 3: a macroscopic topographic image of a porous three-dimensional plugging carbon layer was shown in FIG. 3, wherein a was a surface morphology of a carbon layer, and b was an internal morphology of the carbon layer.

Figure 4:
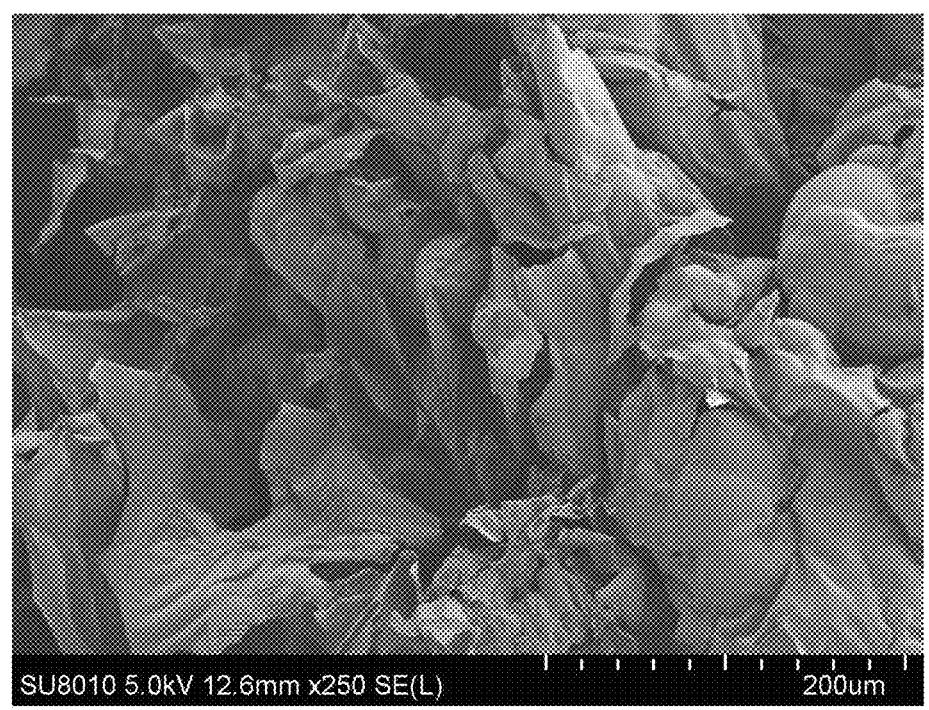
FIG. 4 is a microscopic topographic image of the porous three-dimensional plugging carbon layer.

A microscopic morphology was observed by a scanning electron microscope. A dried plugging agent sample was put into an ark-shaped alumina crucible, heated at 500° C. for 30 minutes in a muffle furnace, and then taken out and scanned by an APREO scanning electron microscope (FEI Company, USA) at a voltage of 2 kV. The observed microscopic morphology of the porous three-dimensional plugging carbon layer was as shown in FIG. 4.

Analysis of results: a volume of the multi-functional plugging agent for the mine is expanded at high temperature to form an expanded carbon layer, and an outer surface of the carbon layer is continuous and dense, which may isolate heat, flame and combustible gas during combustion; and there is an intersected network structure in the carbon layer with closed holes having a diameter of about 30 μm to 50 μm, gas in the holes is mostly a mixture of ammonia, carbon dioxide and air produced by heat decomposition, which can reduce a heat transfer efficiency, thus being possible to inhibit combustion.

The invention claimed is:
1. A multi-functional plugging agent for a coal mine based on an Ecklonia Kurome Okam biological extract, wherein the multi-functional plugging agent for the coal mine contains the Ecklonia Kurome Okam biological extract; and a preparation method of the multi-functional plugging agent for the coal mine comprises:
(1) soaking Ecklonia Kurome Okam in fresh water in a light-proof tank for 3 hours to 4 hours, taking out and then washing the soaked Ecklonia Kurome Okam with running water for 2 times to 3 times, then putting the washed Ecklonia Kurome Okam in a drying oven for drying at 90° C. to 100° C. for 50 minutes to 60 minutes, crushing the dried Ecklonia Kurome Okam in a pulverizer for 3 minutes to 5 minutes, and screening Ecklonia Kurome Okam powder with a particle size less than 120 meshes;
(2) putting the Ecklonia Kurome Okam powder into a reaction container for mixing with water to obtain an Ecklonia Kurome Okam suspension, heating the Ecklonia Kurome Okam suspension to 45° C. to 55° C., stirring the Ecklonia Kurome Okam suspension in an air atmosphere and adding phosphorus pentoxide, stirring the mixture for reaction for 30 minutes and then adding a complex enzyme for continuous stirring for 30 minutes, standing the mixture for reaction for 50 hours to 55 hours, and filtering the mixture to obtain the Ecklonia Kurome Okam biological extract;
(3) adding urea into the Ecklonia Kurome Okam biological extract obtained in step (2) for neutralizing and stirring for 20 minutes, heating the mixture to 60° C. and then stirring the mixture in a nitrogen atmosphere, and sequentially adding 0.5% to 2% by mass fraction of inorganic catalyst and 1% to 3% by mass fraction of melamine for full reaction and mixing to obtain a bio-based plugging synergist solution; and
(4) after cooling the bio-based plugging synergist solution obtained in step (3), uniformly stirring and mixing the solution with pentaerythritol and ammonium polyphosphate to obtain the multi-functional plugging agent for the coal mine based on the Ecklonia Kurome Okam biological extract;
a mixing ratio of the Ecklonia Kurome Okam powder to water in step (2) is 1:35 to 1:45 in a mass ratio; a mass ratio of the added phosphorus pentoxide to water is 1:13 to 1:42; and the complex enzyme is one or more of endoglucanase, cellobiase, carboxypeptidase and beta-glucosidase, with an addition amount of 0.5% to 1.5% by mass fraction;
the inorganic catalyst in step (3) is a layered metal composite hydroxide; and a mass ratio of an addition amount of the urea to the phosphorus pentoxide is 1:1 to 1:3; and
after cooling the bio-based plugging synergist solution obtained in step (4), 100 parts to 105 parts by weight of the solution are uniformly stirred and mixed with 3 parts to 5 parts by weight of the pentaerythritol and 2 parts to 5 parts by weight of the ammonium polyphosphate.

* * * * *